UNITED STATES PATENT OFFICE.

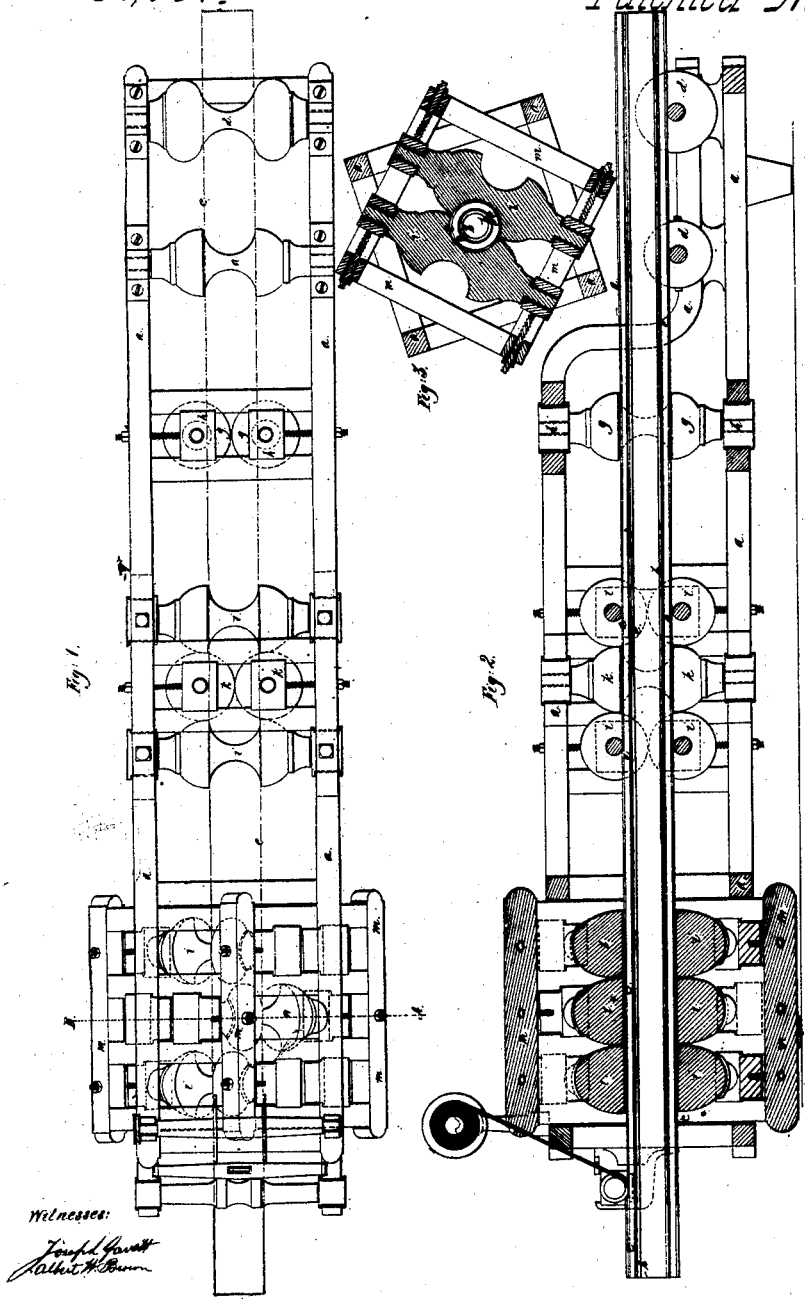

THOMAS J. MAYALL, OF ROXBURY, MASSACHUSETTS.

MACHINERY FOR MAKING INDIA-RUBBER HOSE.

Specification of Letters Patent No. 30,637, dated November 13, 1860.

*To all whom it may concern:*

Be it known that I, THOMAS J. MAYALL, of Roxbury, in the county of Norfolk and State of Massachusetts, have invented certain new and useful Improvements in Machines for Making Hose or Tubing; and I do hereby declare that the following description, taken in connection with the accompanying drawings hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings represent my improvements.

Figure 1 is a plan or top view of my improved machine. Fig. 2 is a central longitudinal vertical section of the same. Fig. 3 is a transverse vertical section taken in the plane of the line A B Fig. 1.

I have heretofore invented a new hose or tubing, which forms the subject of an application for separate Letters Patent, which possesses many advantages over the various kinds of hose or tubing formerly used, and consists of a tube woven of cotton, flax, or other fibrous material, and lined with a coating or sheet of india rubber or gutta percha. The mode I have adopted of making this hose or tubing is first to cover by suitable mechanical devices the woven tube with a coating or encircling sheet of india rubber or gutta percha and then turn the hose thus formed inside out. But I have found it difficult to cover the woven tube with the rubber or gutta percha, and have contrived various devices for accomplishing this result, and after many trials and experiments have produced a machine which will apply the rubber or gutta percha coating to the fibrous tube with smoothness and despatch, so as to securely unite the two, the essential feature of my mode of covering the fibrous tube being the use of a series of rollers having curved peripheries, between which, the fibrous tube, placed upon a mandrel, resting upon a sheet of rubber or gutta percha is fed, in such a manner that the rubber or gutta percha shall be thoroughly united with and driven into the fibers of the woven tube, and form one continuous envelop to the same, extending smoothly around its entire circumference.

*a a a a* in the drawings represent the supporting framework of the machine.

*b b* is a long hollow mandrel upon which is placed a tube *c c* woven of cotton, flax or other fibrous material and fed into the first set of rollers *d d* with a sheet of rubber or gutta percha *e e* placed underneath the tube *c c* and in immediate contact with the rollers *d d*, the sheet of rubber or gutta percha being either coated with rubber cement or left in a sticky or tacky condition. The periphery of the rollers *d d* is of a semi-circular or other curved form, so as to be nearly adapted to the circular shape of the hose and partially embrace the same. The rollers *d d* are placed horizontally across the machine and being revolved act as guides to feed the mandrel &c, along and also to bend up the rubber or gutta percha covering in a gutter form about the woven tube *c c*. A third set of rollers *g g*, similar to the rollers *d d*, but placed vertically and made adjustable so as to be adapted to hoses of different diameters being set in sliding bearings *h h*, serve to still further lap and press, by means of their curved or beveled shape, the covering *e e* upon the tube *c c*, the whole is then fed along to a series of six rollers of similar shape to those before described, four of these rollers *i i i i* being placed horizontally and two *k k* vertically, so that the rubber or gutta percha covering shall be made to entirely encircle the woven tube, this series of rollers working and driving the covering upon the woven tube *c c*, and having adjustable bearings, as shown in the drawings. The fibrous tube with its covering is then passed through a last set of rollers *l l* &c, which are placed in a frame *m m* so as to incline to the line of the mandrel at about an angle of 45°, to which rollers pressure is applied so that they shall act upon every portion of the covering and firmly and smoothly unite it to the fibrous tube. The mandrel with the hose thus formed upon it is then taken out and the hose (with its covering vulcanized or not as may be desirable) is then turned inside out an operation which may be performed, by drawing it from the outside of a hollow tube, into and through the inside of the same or in a variety of other modes,—thereby forming a strong, light and flexible hose, the outside of which consists of a fibrous tube and the inside of a lining of rubber or gutta percha.

It will be obvious that it will be possible to dispense with some of the rollers which operate upon the covering of the fibrous tube and that no greater number of them need be revolved by gears or other devices, than is necessary to feed the mandrel &c, through the machine.

Having thus described my new and improved machine, I shall state my claim as follows:

The use of a series of rollers having curved peripheries which bear upon and work the coating or covering of india rubber or gutta percha into the surface of the woven tube placed upon a suitable mandrel, substantially as described.

THOS. J. MAYALL.

Witnesses:
ROBT. L. HARRIS,
ALBERT W. BROWN.